United States Patent [19]
Tilton

[11] Patent Number: 6,098,338
[45] Date of Patent: Aug. 8, 2000

[54] PLANTER

[76] Inventor: Donald D. Tilton, 51 Springfield Cir., Merrimack, N.H. 03054

[21] Appl. No.: 09/177,713

[22] Filed: Oct. 23, 1998

[51] Int. Cl.[7] .............................. A01G 9/02; A01G 17/00; A01N 1/00
[52] U.S. Cl. .................................. 47/66.6; 47/25; 428/15
[58] Field of Search .............................. 47/21, 24, 28.1, 47/30, 66.1, 66.3, 66.4, 66.5, 66.6, 73, 85, 86, 65, 65.5

[56] References Cited

U.S. PATENT DOCUMENTS

| | | | |
|---|---|---|---|
| D. 235,908 | 7/1975 | Rosenwach | D11/144 |
| 329,926 | 11/1885 | McMaster | 47/23 |
| D. 393,816 | 4/1998 | Conner | D11/143 |
| 3,154,211 | 10/1964 | Bobowski | 220/3.92 |
| 3,906,664 | 9/1975 | Hall | 47/34 |

*Primary Examiner*—Peter M. Poon
*Assistant Examiner*—Francis T. Palo
*Attorney, Agent, or Firm*—Joseph E. Funk

[57] ABSTRACT

A planter is disclosed which looks like a half barrel that may be placed over low things such as tree stumps, or may be wrapped around tall things such as trees and poles. Containers that are part of the planter are placed in the top of the open planter over low things, or between the planter wall and the tree or pole, and are supported therein by a retainer device. Real or plastic plants and flowers may be placed in the containers for aesthetic purposes.

10 Claims, 10 Drawing Sheets

PLANTER

FIELD OF THE INVENTION

This invention relates to planters and more particularly planters that are used to hide aesthetically non-pleasing things such as tree stumps and well heads, or to improve the aesthetic appearance of such things as poles and trees.

BACKGROUND OF THE INVENTION

In the prior art planters have long been used outdoors to improve the aesthetic appearance of many things. Planters are placed on window sills, on porch steps, on the open ground, and are hung from many more places in homes and in businesses. They are even combined with functional items such as mailboxes.

Large planters, such as old barrels and half barrels, are often used around houses and businesses. Because of their size they are not dwarfed by trees, mailboxes, light poles, tree stumps, and other larger items found outdoors. However, such planters can only be placed alongside things such as poles, trees, mailboxes, well heads, and telephone terminal boxes to improve their aesthetic appearance because of their physical limitations. This provides a pleasing appearance in one direction but not in other directions. Thus, aesthetically non-pleasing items such as stumps, well heads, and telephone terminal boxes are not completely hidden. Placing such a planter alongside things such as trees and poles provides an improved look, but does not provide a balanced, aesthetically pleasing look.

One planter in the prior art is generally U-shaped and can slip around trees or poles having not more than a predetermined diameter, but in the direction of the top of the "U" the pole or tree is not completely surrounded which detracts from the aesthetic pleasing appearance.

Thus, there is a need in the art for a planter that can be used to completely hide aesthetically non-pleasing items such as stumps, well heads, and telephone terminal boxes.

There is also a need in the art for a planter that can surround vertical objects such as poles and trees to provide a balanced, aesthetically pleasing appearance.

SUMMARY OF THE INVENTION

The needs of the prior art are met by the present invention. The invention provides a planter which completely hides aesthetically non-pleasing items such as stumps, well heads, and telephone terminal boxes. In addition, the invention provides a planter that completely surrounds vertical objects such as poles and trees to provide a balanced, aesthetically pleasing appearance.

My novel planter has an upright, circular portion that may sit astride and surround aesthetically non-pleasing items such as stumps, well heads, and telephone terminal boxes; or may be wrapped around items such as poles and trees. A planting insert located within the upright, circular portion is supported by support means attached to the interior wall of the circular portion and dirt and plants are placed only in the insert. The insert may be easily and quickly removed to provide access to well heads, gas main shut-offs and telephone terminal boxes that are covered by the planter. In this manner non-pleasing items are completely hidden from view. In the preferred embodiment of the invention my novel planter is manufactured and shipped relatively flat and is assembled to form a circular planter which is then set over stumps and the like with a planting insert inserted into the top of the planter. The preferred embodiment of my novel planter may also be wrapped around a pole or tree and one or more planting inserts placed between the interior wall of the upright, circular portion of the planter and the tree or pole to hold dirt and plants. In this manner the tree or pole is completely surrounded by the planter with planting insert to provide a balanced, aesthetically pleasing appearance. The upright portion of the planter does not have to be filled with dirt so the use of the planter will not kill the tree, and pre-potted plants may be placed in the planting insert.

DESCRIPTION OF THE DRAWING

The invention will be better understood upon reading the following detailed description in conjunction with the drawing in which.

DETAILED DESCRIPTION

Figure 1:
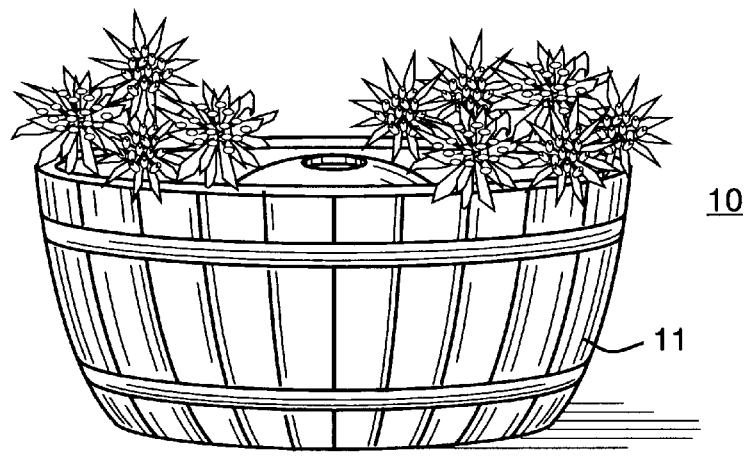
FIG. 1 shows an embodiment of the invention, in the form of a half-barrel shaped planter, used to hide such items as stumps, gas main shutoffs and well heads while serving as a planter.
Figure 10:
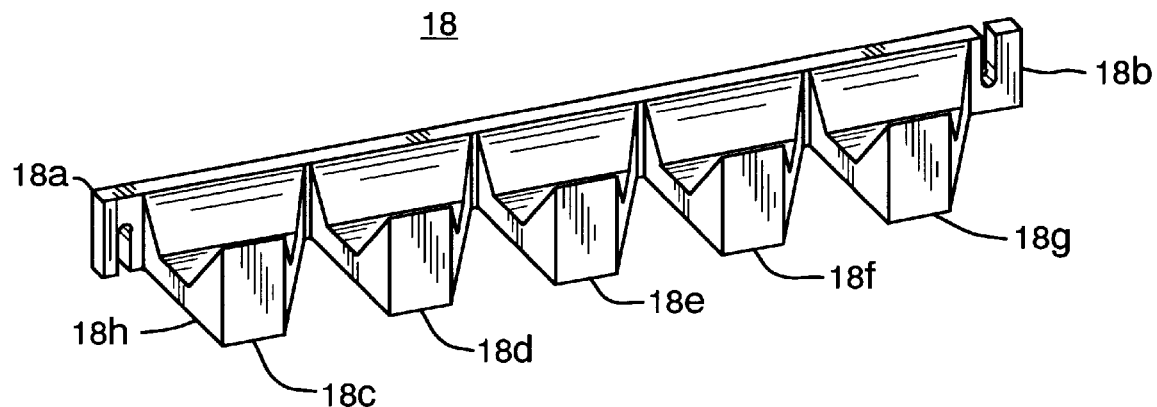
FIG. 10 shows the planting insert as manufactured.
Figure 11:
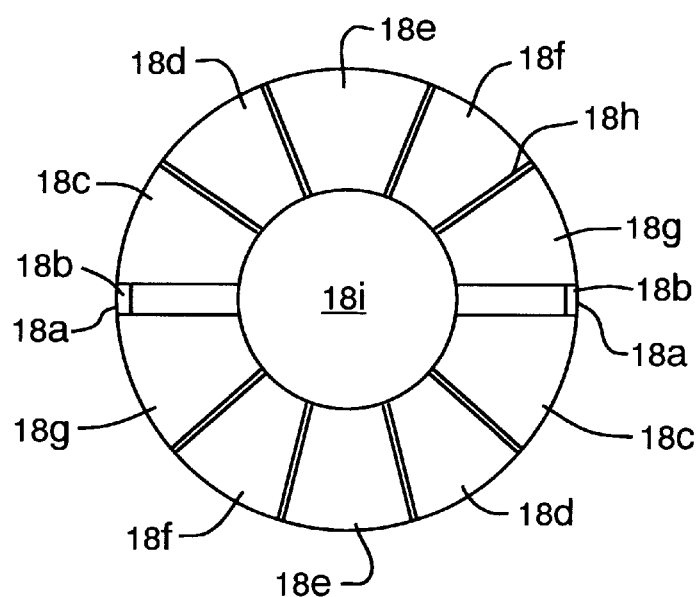
FIG. 11 shows the planting insert assembled and ready to be insert into the completed planter.

In FIG. 1 is shown a first embodiment of planter 10, in the appearance of a half-barrel, used to hide such things as stumps, gas main shutoffs and well heads and provide an aesthetically pleasing appearance. In FIG. 1, the outer element or upright portion of planter 10, hereinafter referred to as half-barrel 11 or upright portion 11, is positioned over a gas main shutoff 12 which is not specifically shown in FIG. 1 but shown in FIG. 2. After half-barrel 11 is positioned over gas main shutoff 12, a plastic, planting insert or container 18 (such as shown in FIGS. 10 and 11) is placed inside assembled barrel 11. Dirt and plants are placed in insert to complete the installation.

Figure 2:
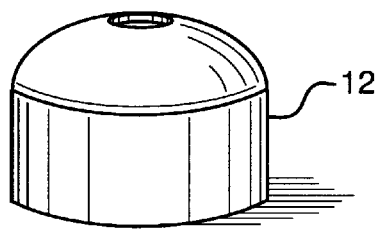
FIG. 2 shows a gas main shut off housing to be covered with a planter as shown in FIG. 1.
Figure 3:
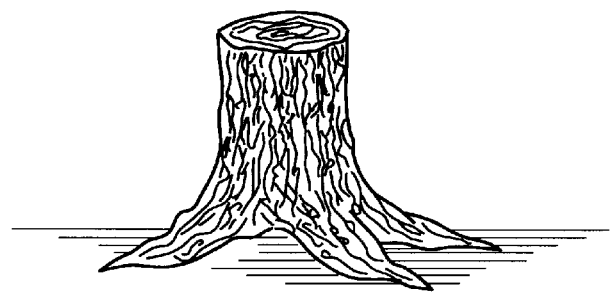
FIG. 3 shows a tree stump to be covered with a planter as shown in FIG. 1.

In FIG. 2 is shown a gas main shut off 12, and FIG. 3 shows a tree stump, both of which are not aesthetically pleasing to look at but may be concealed using planter 10.

Figure 4:
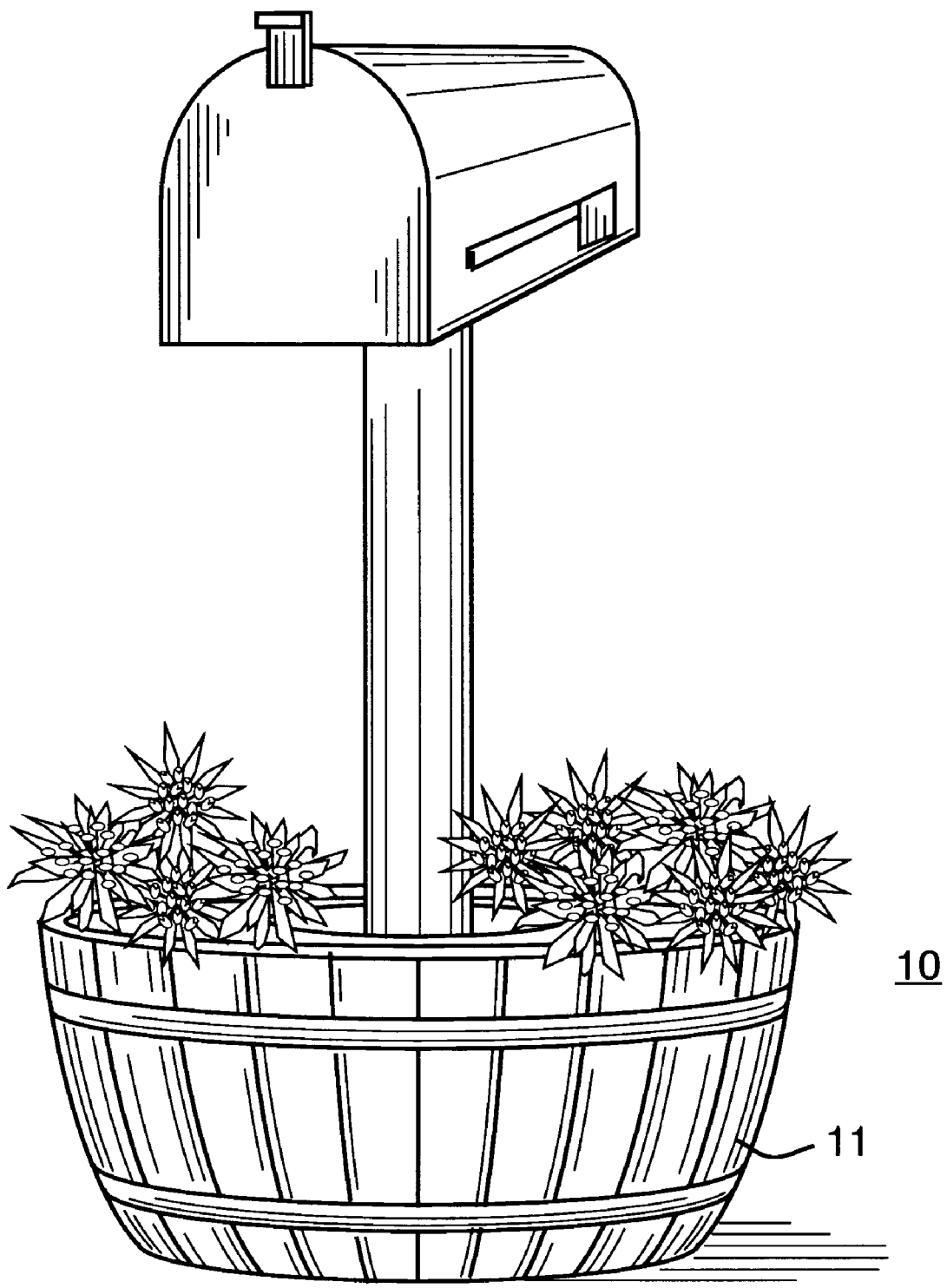
FIG. 4 shows a planter, in the form of a half-barrel, wrapped around a mail box pole to provide an aesthetically pleasing appearance.

FIG. 4 shows half-barrel planter 10 assembled by wrapping half-barrel 11 around the support post of a mail box and inserting a planting insert with dirt and plants to provide a more pleasing appearance to the mail box.

Figure 5:
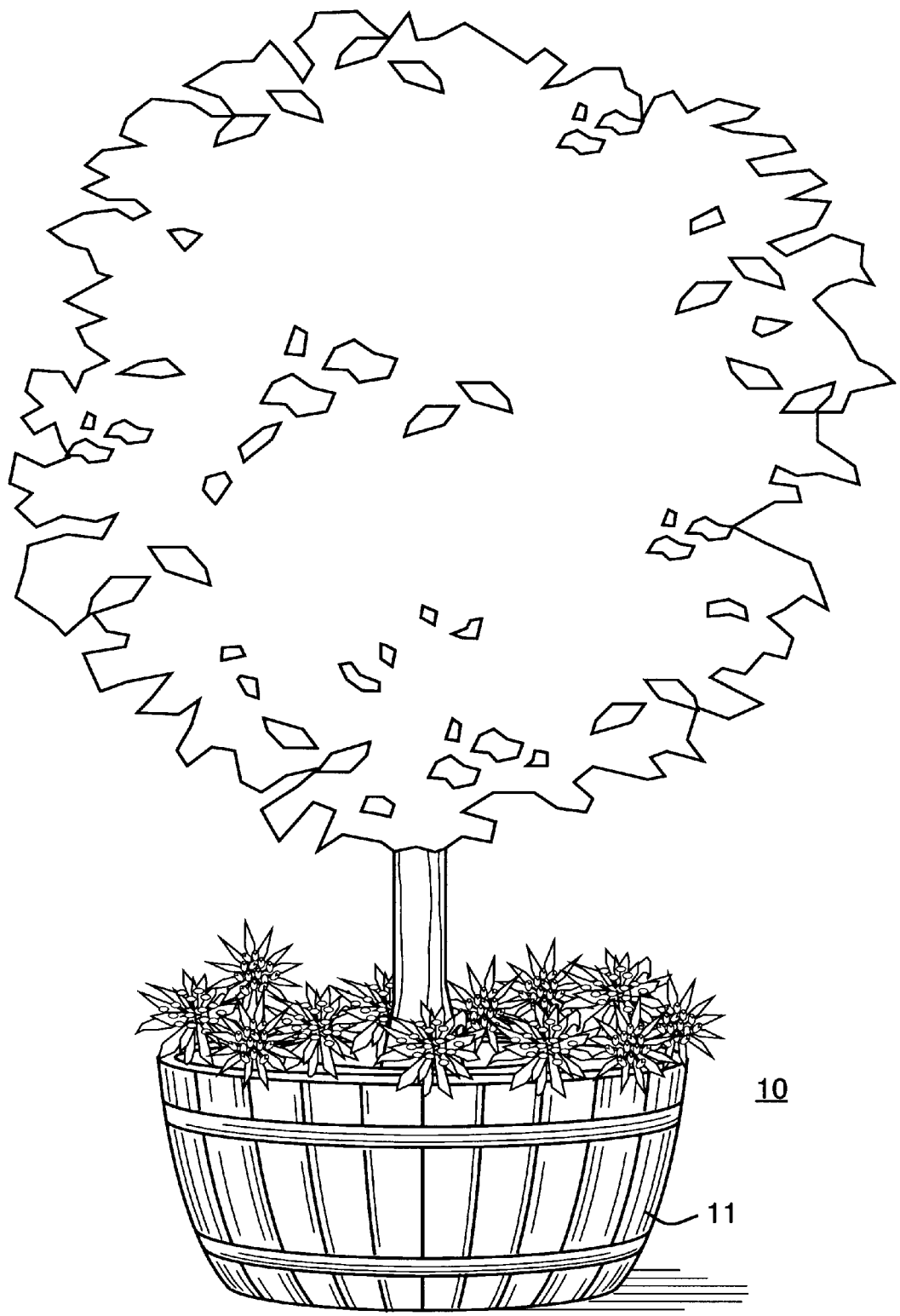
FIG. 5 shows a planter, in the form of a half-barrel, wrapped around the base of a tree to provide an aesthetically pleasing appearance.

FIG. 5 shows half barrel planter 10 assembled by wrapping half-barrel 11 around a tree and inserting a planting insert with dirt and plants to provide a more pleasing appearance to the tree.

Figure 6:
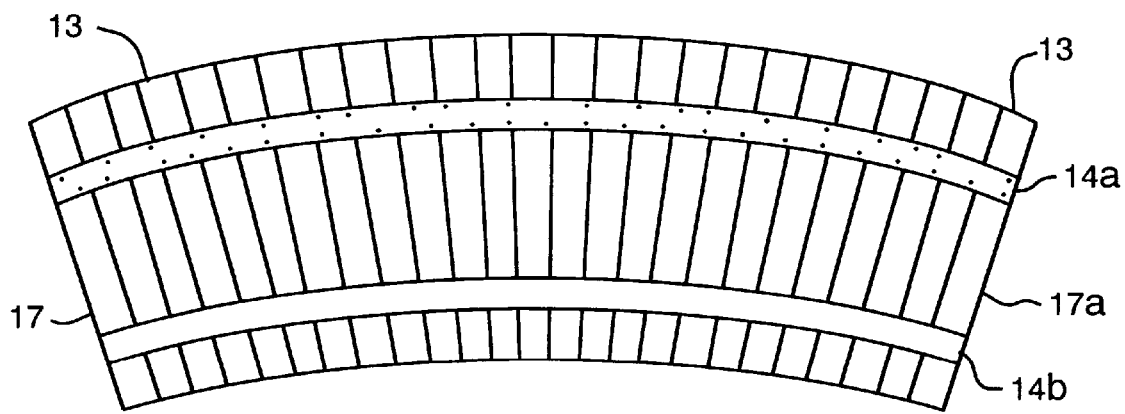
FIG. 6 shows the upright, circular portion of the planter, appearing as a half-barrel, as manufactured in flat form for distribution.

FIG. 6 shows the outer side of wrap-around, half-barrel 11 of half-barrel planter 10 in accordance with the preferred embodiment of the invention. The half-barrel portion 11 of barrel planter 10 is manufactured flat, as shown, with elements 13 that look like barrel staves (hereinafter referred to as barrel staves) that are fastened to bands 14a and 14b. Bands 14a and 14b are rigid enough to support barrel staves 13, but are not so rigid that they cannot be easily wrapped around a tree or pole and the ends 17 and 17a of half-barrel 11 are fastened together to hold the unit in the barrel shape shown in FIGS. 1,3 and 7. Fastened to the inner surface of barrel staves 13 is a support means, not shown in FIG. 6 which shows only the outer side of half-barrel 11, and the support means is fastened to the inner side of half-barrel 11. The support means supports a planting insert inside barrel planter 10 as shown in FIGS. 1, 4, 5, 12, 14 and 15, and the support means is particularly shown in and described with reference to FIGS. 8 & 9.

Figure 7:
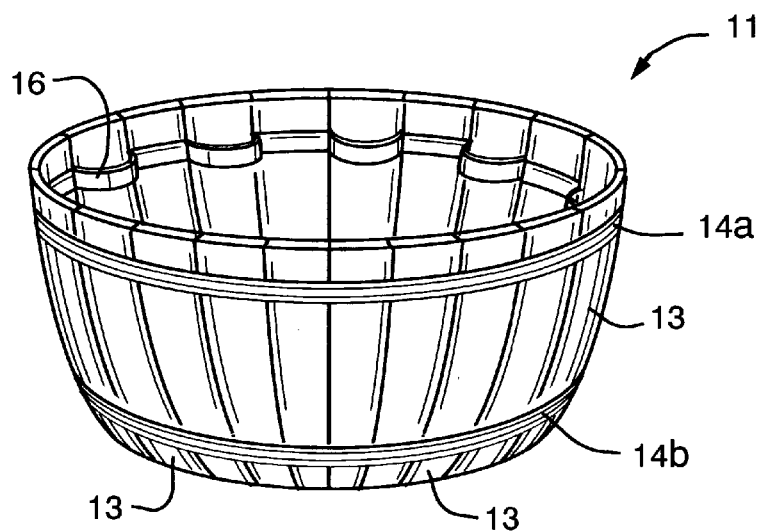
FIG. 7 shows the upright, circular portion of the planter, appearing as a half-barrel, assembled for use, and showing the internal support means for a planting insert placed inside the planter.

In FIG. 7 is shown half-barrel wall portion 11 of barrel planter 10 assembled into its normal circular shape for use as a planter. The outer, visible, side of wall portion 11 is shown with bands 14a and 14b, and staves 13. On the inside of half-barrel 11 are fastened support means 16 to support plastic planting inserts 18 which are shown in FIGS. 10 and 11.

Figure 8:
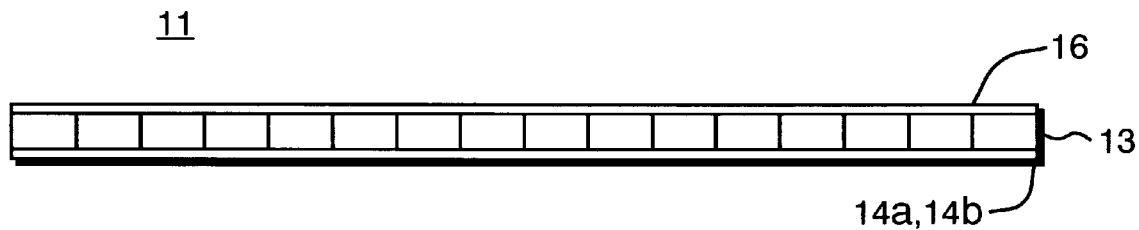
FIG. 8 shows the internal support means for a planting insert attached to the inside wall of the upright, circular portion of the planter during manufacture.

FIG. 8 shows an end view of half-barrel 11 lying flat with its staves 13, just as it is manufactured and distributed. On the outer surface are bands 14a and 14b, while on the inner surface is support means 16.

Figure 9:
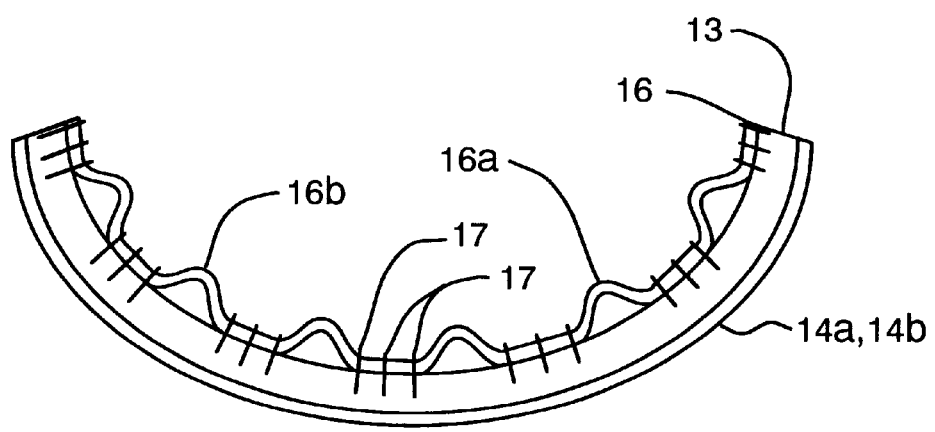
FIG. 9 shows the internal support means for a planting insert as it deforms and provides the support function when the upright, circular portion of the half-barrel planter is assembled into its circular shape for use.

FIG. 9 shows a part of half-barrel 11 bent as it is formed into a circle to create upright half-barrel 11 of planter 10. Not shown in FIG. 8, but shown in this Figure, support means 16 is fastened to staves 13 with staples 17 or other fastening means. When half-barrel 11 is bent, exemplary segments 16a and 16b between each set of staples 17 deform inward as shown to create protrusions toward the inside of half-barrel 11 upon which the bottom outer edge of planting inserts 18 (not shown) sit and are supported.

In FIG. 10 is shown planting insert 18. Insert 18 is manufactured flat, as shown, and one or more of them may be used. When used, insert 18 is bent into a circle as shown in FIG. 11. There are a plurality of cup segments 18c–18g. Each cup segment has two side walls, such as 18h, which sides are cut down as shown. In addition, each of cup segments 18c–18g has a somewhat triangular shape which permit bending insert 18 into a circle as shown in FIG. 11. Each cup segment has drain holes in its bottom (not shown)

that permit the drainage of excess water added to soil in planting insert 18 to prevent "drowning" plants therein. At the ends of planting insert 18 are extensions 18a and 18b which are used to fasten insert 18 into a circle as shown in FIG. 11. Each extension 18a and 18b has a slot therein and the slots are hooked into each other to fasten one or more inserts 18 into a circle. More than one planting insert 18 may be provided for use with smaller or larger barrel planters 10. When more than one planting insert 18 is provided, their extensions 18a and 18b are hooked together as shown in FIG. 11.

In FIG. 11 two planting inserts 18 are shown hooked end-to-end to form a circle. In this manner inserts 18 may be wrapped around a tree or pole before being hooked together. When planting insert 18 is placed in the top of half-barrel 11 of a barrel planter 10, the bottom, outer edge of the insert sits on and is supported by support elements 16. When placed in assembled half-barrel planter 10 planting insert 18 fits firmly and snugly against the inside of half-barrel 11 of half-barrel 10 and helps provide rigidity to its shape. When planting insert is wrapped as shown in FIG. 11, the low side walls 18h of adjacent cup segments 18c–18g are adjacent to each other and dirt may be spread across the low walls 18h if so desired. Alternatively, potted plants may be transplanted into individual ones of cup segments 18c–18g, and may be individually changed. By the use of planting insert 18, half-barrel 11 need not be filled with dirt which would kill a tree around which half-barrel 11 is wrapped. As shown in FIG. 11, assembled planting insert 18 has a hole 18i through its center. Hole 18i permits a tree or pole to extend therethrough as shown in FIGS. 4 and 5 or, when used as shown in FIG. 1, permits access to such things as a water shut off under planting 18 without having to remove the insert and plants therein. A snap-in, solid disk piece (not shown) is provided to cover hole 18i when half-barrel planter 10 is not used around a tree or pole.

Figure 12:
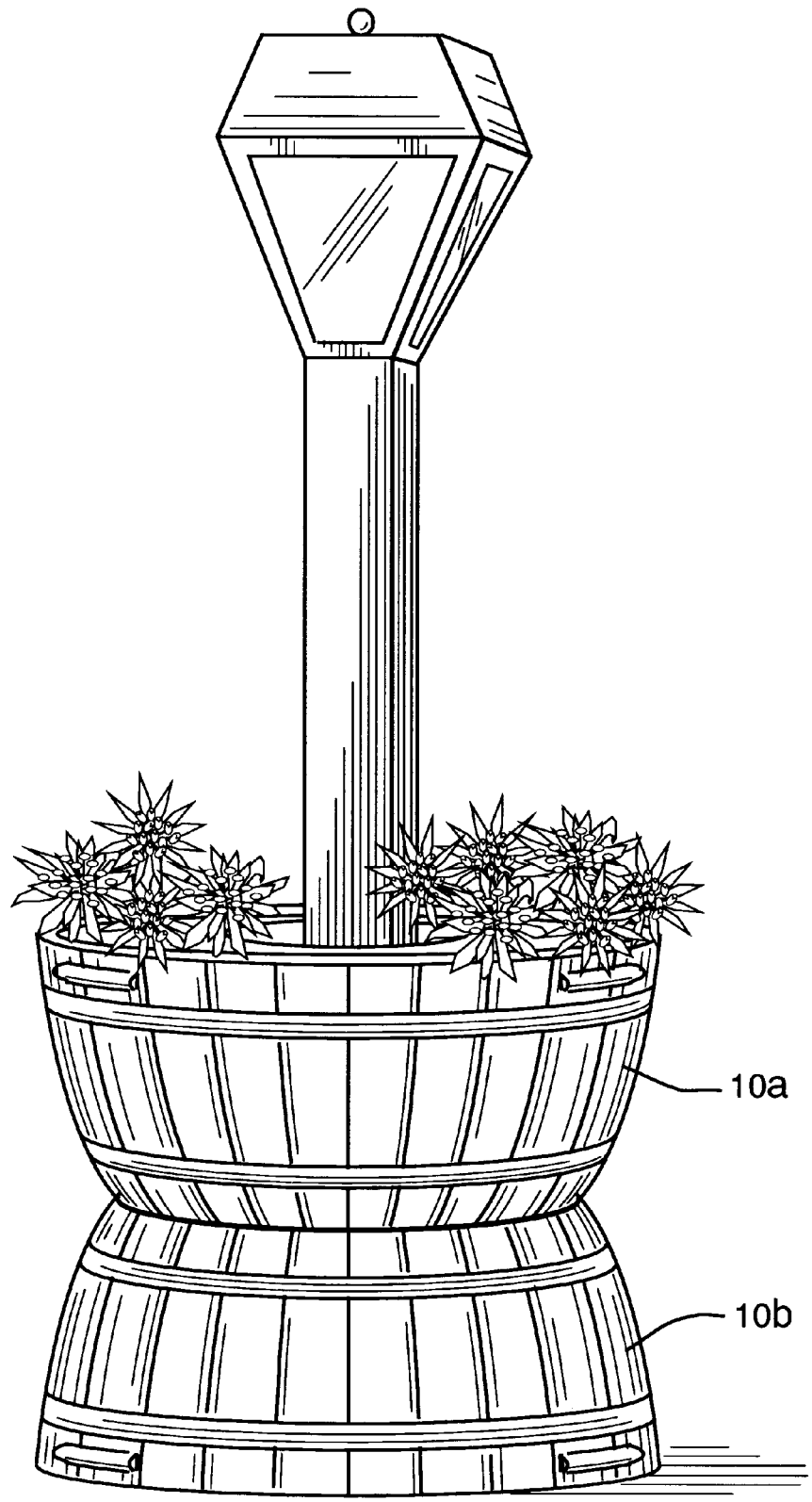
FIG. 12 shows two planters oriented in an inverted manner with respect to each other to provide a more pleasing appearance to a lamp post.
Figure 13:
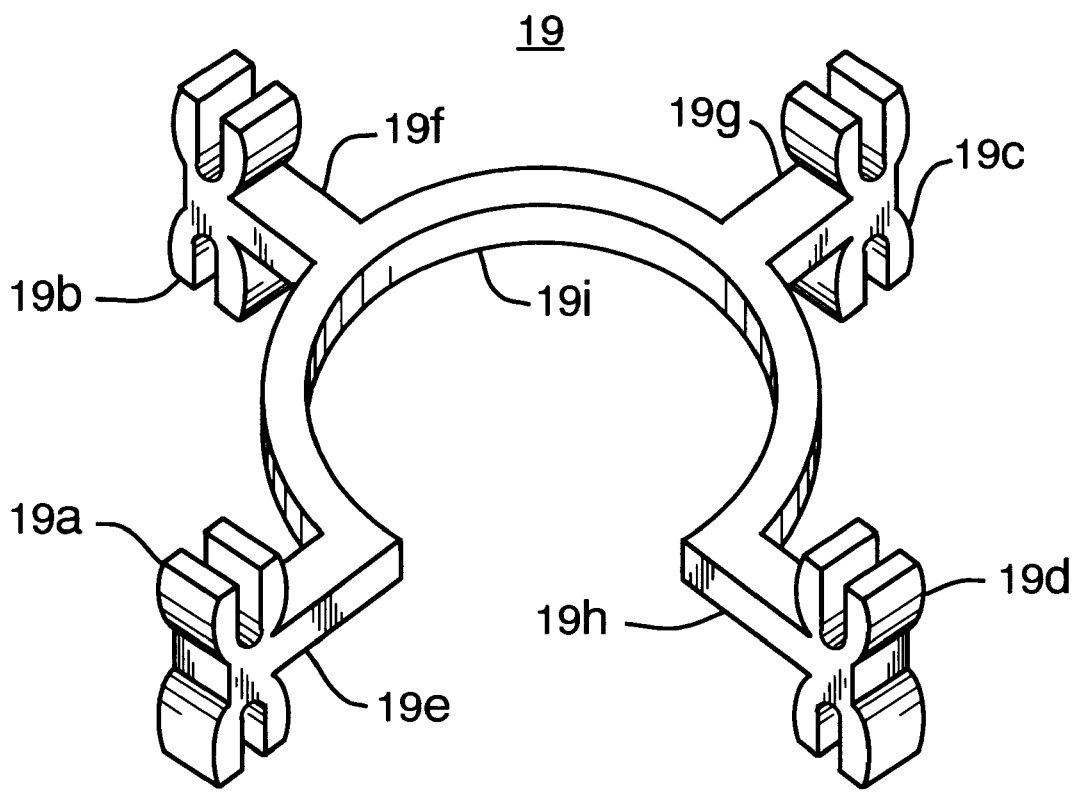
FIG. 13 shows an adapter with clips used to maintain the two half barrel looking planters in FIG. 12 in proper relationship to each other.

In FIG. 12 is shown a variant use of wrap-around barrel planter 10. In this configuration lower half-barrel 10a is inverted and upper half-barrel 10b sits thereon as shown. To maintain the two half-barrels planters 10a and 10b in proper relationship to each other an adapter 19, shown in FIG. 13, is utilized. Adapter 19 has four arms 19e–19h that are attached to a three-quarter ring 19i. At the end of each of arms 19e–19h is an adapter clip 19a, 19b, 19c and 19d as shown. Each of the clips 19a–19d has a notch in its upper side and its lower side. The opening in ring 19i is used to slip adapter 19 around a post or tree when two half-barrel planters 10a and 10b are oriented as shown in FIG. 12. The lower notch of each clip sits on the top lip of lower half-barrel planter 10a, and the upper notch of each of these clips fit over the lower lip of upper half-barrel planter 10b. With this plurality of adapter clips located between upper and lower half-barrels 10a and 10b, these two half-barrels remain in proper relationship to each other.

Figure 14:
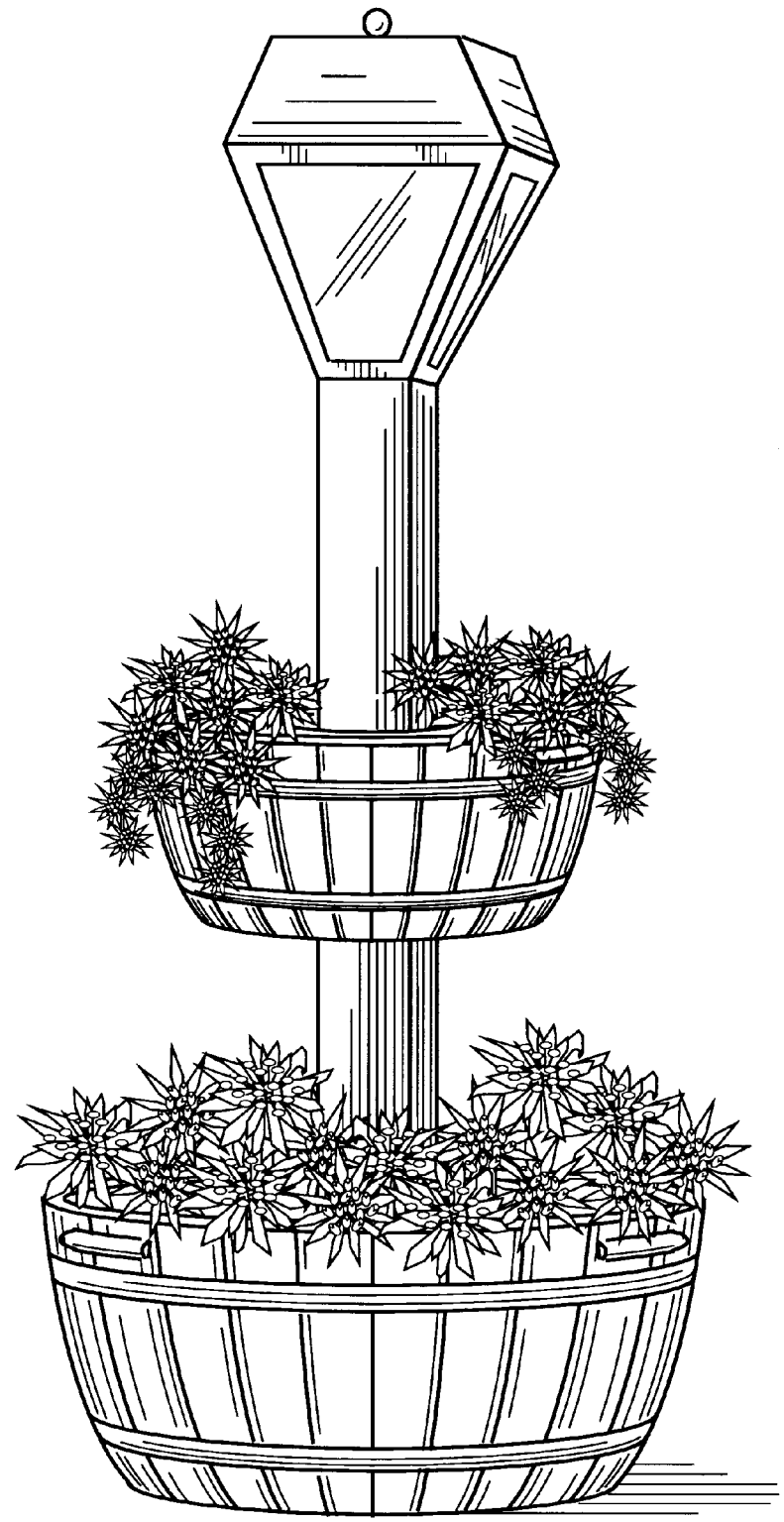
FIG. 14 shows two planters, appearing as half-barrels, of different sizes and spaced vertically to provide a more pleasing appearance to a lamp post.
Figure 15:
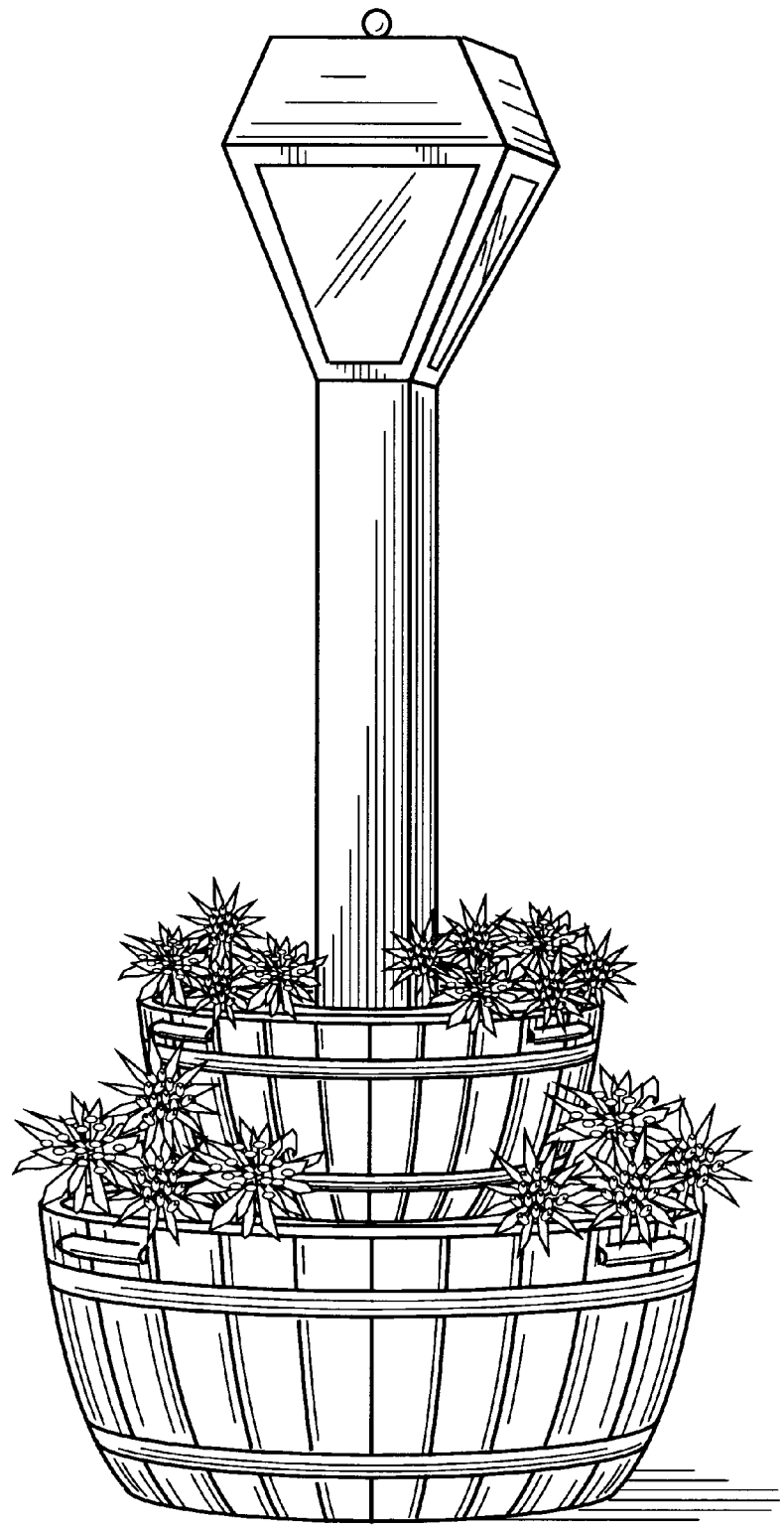
FIG. 15 shows two planters, appearing as half-barrels, of different sizes and oriented vertically, but on top of each other to provide a more pleasing appearance to a lamp post.

In FIGS. 14 and 15 are shown variant uses of the wrap-around, half-barrel planters 10 of FIGS. 4 and 5. Two different size barrel planters are used, and a support means (not shown) is fastened to the lamp pole and supports the smaller, upper barrel planter.

While what has been disclosed herein is the preferred embodiment of the invention, it will be obvious to those skilled in art that numerous changes may be made without departing from the spirit and scope of the invention.

What is claimed is:

1. A planter used to enhance the aesthetics of things, said planter comprising:

an outer element having a wall that surrounds the thing of which it is desired to enhance the aesthetic appearance, the appearance of said outer element having a pleasing appearance;

container means that sets inside said outer element and is used to contain plants or other things that in conjunction with the planter improves the aesthetic appearance; and support means that cooperates with said outer element to support said container means inside said outer element;

wherein said outer element is manufactured as a flat piece, has an outer side and an inner side and said outer side is seen when said planter is assembled and in use, said support means comprises a flat strip and fastening means and is fastened to the inner side of said outer element by said fastening means as said outer element is manufactured, and when said outer element is bent into a circular shape for use, portions of said support means between said fastening means bow outward from the inner surface of said outer means and toward the interior of said outer element, and said container means rests on said bowed portions of said support means when it is inserted into said outer element.

2. The planter in accordance with claim 1 wherein said container means comprises a plurality of cup means connected together in a row, said container means having a first end and a second end that are connected together to form said container means in a general circular shape before insertion into said outer means after it has been wrapped into a circular shape.

3. The planter in accordance with claim 2 wherein said container means has a hole through its center which permits access to things, such as a water shut off valve that may be under both said outer element and said container means, without having to remove said container means; and which permits a tree or pole to extend up through said planter through said hole.

4. The planter in accordance with claim 3 wherein a first outer element is stacked on top of a second outer element and further comprising adapter means cooperating with the top edge of said second outer element and the bottom edge of said first outer element to retain said first outer element on top of said second outer element, a container means being set inside only the top of said first outer element.

5. The planter in accordance with claim 1 wherein said outer element is manufactured as a flat piece with a first end and a second end, and said outer element is wrapped around things such as a tree or a post and its first end is fastened to its second end to maintain said outer element in a circular shape around said things such as trees or posts.

6. The planter in accordance with claim 5 wherein said container means comprises a flat piece having a plurality of cup means connected together, said container means having a first and a second end, and said container means are bent around and said first end and said second end are fastened together before said container means is inserted into said assembled outer element.

7. The planter in accordance with claim 6 further comprising support means that cooperates with said outer element to support said container means inside said outer element.

8. The planter in accordance with claim 7 wherein said outer element has an outer side and an inner side and said outer side is seen when said planter is in use, said support means comprises a flat strip and fastening means which is fastened to the inner side of said outer element by said fastening means as said outer element is manufactured as a flat piece, and when said outer element is bent into a circular shape for use, portions of said support means between said fastening means bow outward from the inner surface of said outer means and toward the interior of said outer element, and said container means rests on said bowed portions of said support means when it is inserted into said outer element.

9. The planter in accordance with claim 8 wherein said container means comprises a plurality of cup means connected together in a row, said container means having a first end and a second end that are connected together to form said container means in a general circular shape before insertion into said outer element after it has been wrapped into a circular shape.

10. The planter in accordance with claim 9 wherein a first outer element is stacked on top of a second outer element and further comprising adapter means which cooperate with the top edge of said second outer element and the bottom edge of said first outer element to retain said first outer element on top of said second outer element, a container means being set inside only the top of said first outer element.

* * * * *